United States Patent
Hill et al.

(10) Patent No.: US 8,142,691 B2
(45) Date of Patent: Mar. 27, 2012

(54) THERMAL CASTING OF POLYMERS IN CENTRIFUGE FOR PRODUCING X-RAY OPTICS

(75) Inventors: Randy M. Hill, Livermore, CA (US); Todd A. Decker, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 2284 days.

(21) Appl. No.: 10/956,631

(22) Filed: Sep. 30, 2004

(65) Prior Publication Data
US 2006/0071354 A1    Apr. 6, 2006

(51) Int. Cl.
*B29D 11/00* (2006.01)
(52) U.S. Cl. ........... 264/1.7; 264/1.9; 264/2.1; 264/310; 264/311; 427/162
(58) Field of Classification Search ................... 264/310, 264/311, 1.7, 1.9, 1.1, 2.1; 427/162
See application file for complete search history.

(56) References Cited

U.S. PATENT DOCUMENTS

| | | | |
|---|---|---|---|
| 6,087,412 A | 7/2000 | Chabrecek et al. | |
| 6,214,272 B1* | 4/2001 | Gruenwald et al. | 264/255 |
| 6,254,243 B1 | 7/2001 | Scrivens | |
| 6,278,764 B1 | 8/2001 | Barbee, Jr. et al. | |
| 6,431,715 B2 | 8/2002 | Scrivens | |
| 2003/0194054 A1 | 10/2003 | Ziock et al. | |

* cited by examiner

*Primary Examiner* — Mathieu D. Vargot
(74) *Attorney, Agent, or Firm* — Eddie E. Scott

(57) ABSTRACT

An optic is produced by the steps of placing a polymer inside a rotateable cylindrical chamber, the rotateable cylindrical chamber having an outside wall, rotating the cylindrical chamber, heating the rotating chamber forcing the polymer to the outside wall of the cylindrical chamber, allowing the rotateable cylindrical chamber to cool while rotating producing an optic substrate with a substrate surface, sizing the optic substrate, and coating the substrate surface of the optic substrate to produce the optic with an optic surface.

15 Claims, 2 Drawing Sheets

THERMAL CASTING OF POLYMERS IN CENTRIFUGE FOR PRODUCING X-RAY OPTICS

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to optics and more particularly to thermal casting of polymers in centrifuge for producing x-ray optics.

2. State of Technology

U.S. Pat. No. 6,278,764 to Troy W. Barbee, Jr. et al for high efficiency replicated X-ray optics and fabrication method issued Aug. 21, 2001 provides the following state of technology information: "X-ray optical devices are used to change the propagation path of travel of x-rays. These devices can also serve to preferentially select x-rays of a desired wavelength range from a broader band of wavelengths. X-ray optical elements primarily use the mechanism of reflection, in contrast to visible light optics that commonly use refraction. To be efficient, x-ray mirrors must have a surface smoothness on the scale of the x-ray wavelength. Since typical x-ray wavelengths are 1-100 Å for these applications, the surface must be smooth on the atomic scale. To provide such a smooth surface is an exceedingly difficult and time-consuming procedure.

In 1952, Wolter proposed the application of a double specular reflection mirror system having a closed surface for focusing of x-rays. This structure was substantially more complex than previous optics and presented serious fabrication difficulties. First attempts to produce Wolter optics were initiated in the 1960's using electrodeposition on negative forms due to the closed surface of these optics. These replication attempts were unsuccessful as very poor figure and surface quality were achieved. In the 1980's, efforts were reinitiated for the development of thin shell structures for space telescopes. These negative form electrodeposition replication efforts have been used in the Czech Republic, Italy, and the United States. Several replication fabricated Wolter structures have been flown in space. These mirrored surfaces achieved the figure and roughness values approaching 15 Å rms that are adequate for those applications, but not for applications requiring greater resolution and using shorter x-ray wavelengths.

The replication technique has the potential of lower cost and ease of manufacture. The cost of internally polishing and coating the surface of a tubular optic (typical length 10 cm, average diameter 2 cm) and achieving the smooth internal surface finish required is on the order of $500,000 and requires about one year to fabricate. Each optic device produced would have similar cost and time considerations. By comparison, the use of a negative form mandrel reduces the cost by a factor of 10-100 per mandrel for substrate preparation during development, with further significant cost reductions in the manufacturing stage. In view of the demonstrated effectiveness of the replication approach in the fabrication of moderate resolution Wolter space telescopes, research was directed towards the use of replicated optics for x-ray microscopes used in inertial confinement fusion studies and collimators for x-ray proximity lithography.

A primary problem with replicated optics has been achieving smoothness on the replicated part. Past efforts have not been able to achieve a roughness less than 12-15 Å rms. This resulted from the low strength of the layer directly in contact with the mandrel and the lack of control of the adhesion of this layer to the mandrel. Parting of the optic from the mandrel causes plastic deformation of the reflecting layer and degradation of the smoothness of the reflecting surface. The decrease in efficiency and attainable imaging resolution resulting from a surface roughness of 12-15 Å rms is unacceptable. Thus, there is a need for a method to make x-ray optics with a surface roughness less than 12 Å rms."

United States Patent Application No. 2003/0194054 to Klaus-Peter Ziock, William, W. Craig, Bruce Hasegawa, and Michael J. Pivovaroff for biomedical nuclear and X-ray imager using high-energy grazing incidence mirrors issued Oct. 16, 2003 provides the following state of technology information: "Imaging of radiation sources located in a subject is explored for medical applications. The approach involves using grazing-incidence optics to form images of the location of radiopharmaceuticals administered to a subject. The optics are "true focusing" optics, meaning that they project a real and inverted image of the radiation source onto a detector possessing spatial and energy resolution."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides an optic that has an extremely smooth finish on the surface. In order to collect a sufficient amount of high energy photons for imaging, a large collection area is required. Since the high energy photons must be reflected at very small angles relative to the reflecting surface, the optic must be constructed with concentric circular surfaces that allow the light to reach the inner surface of the optic. The surfaces of the optics must be extremely smooth and have the appropriate shape to reflect the light to the detector or target.

The optic is produced by the steps of placing a polymer inside a rotateable cylindrical chamber, the rotateable cylindrical chamber having an outside wall, rotating the cylindrical chamber, heating the rotating chamber forcing the polymer to the outside wall of the cylindrical chamber, allowing the rotateable cylindrical chamber to cool while rotating producing an optic substrate with a substrate surface, sizing the optic substrate, and coating the substrate surface of the optic substrate to produce the optic with an optic surface.

The finished optic has a surface that has a roughness of substantially 3.5 angstrom rms or less. The surface of the optic is a curved surface and the curved surface is a reflecting surface that has a roughness of 3.5 angstrom rms or less. The surface is coated with a multilayer coating. In one embodiment the substrate surface is coated with thin alternating layers of metal.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
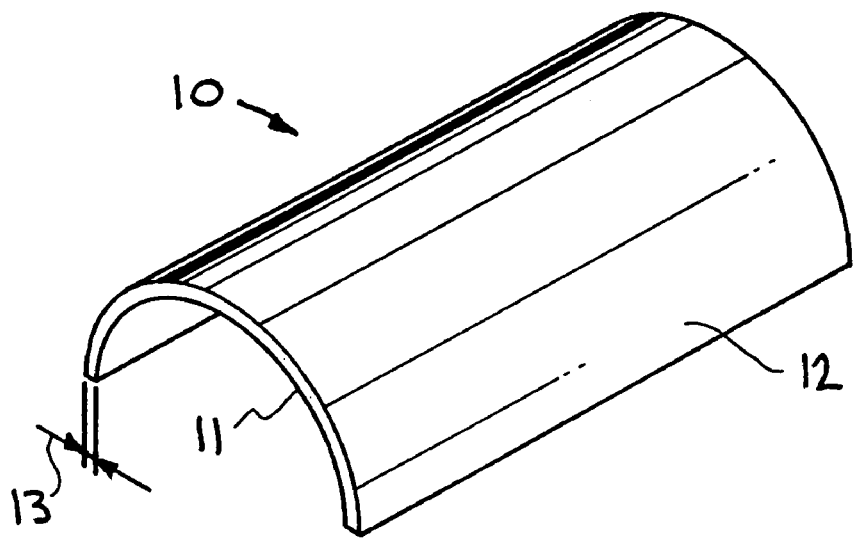
FIG. 1 illustrates one embodiment of an optic produced in accordance with the present invention.

Referring now to the following detailed description, the drawing figures, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Thermally formed optics from flat and very smooth sheets of thin glass are the current state of the art. The slumping into or over a mandrel of the correct size does not produce the required straightness of the final optic and the optic must be elastically deformed to correct this deficiency. The optic produced in accordance with the present invention produces a substrate that is straight along the optical axis and has the smoothness that is required for a high energy photon reflector. The advantage to this substrate is the ease of fabrication, extremely low cost, and very low mass compared to currently technologies that use nickel, glass, and other exotic materials.

Referring to FIG. 1, one embodiment of an optic produced in accordance with the present invention is illustrated. This embodiment of an optic produced in accordance with the present invention is designated generally by the reference numeral 10. The optic 10 comprises a body section 11 that has a thickness 13 and a surface 12. The optic 10 has many uses. For example, the optic 10 can be used as an x-ray optic or the finished reflecting element in a high energy telescope or collimator. The optic 10 is a high energy optic with the reflecting surface 12 that can be gold, platinum, or a multilayer coating.

In one embodiment of an optic produced in accordance with the present invention the reflecting surface 12 of the optic 10 is a multilayer coating consists of many thin layers of two alternating metals, such as tungsten and silicon. Since the wavelength of light is extremely short and the light is presented to the optical surface at a very shallow angle, any imperfections in the surface 12 on all lengths scales are detrimental to the performance of the optic 10. The roughness for an x-ray optic is typically 3.5 angstrom (Å) rms or less. The optic 10 can be conic, in which the optic 10 will have a straight profile, or have a parabolic/hyperbolic profile. In all cases, the requirement for the optic 10 allows for only slight deviations from the intended surface profile. The tolerance is expressed in terms of angular deviation of the surface slope of the optic 10 and can be on order of 10 arc-seconds. This tolerance depends on the intended application of the optic.

The optic 10 has an extremely smooth finish on the surface 12. In order to collect a sufficient amount of high energy photons for imaging, a large collection area is required. Since the high energy photons must be reflected at very small angles relative to the reflecting surface, the optic must be constructed with concentric circular surfaces that allow the light to reach the inner surface of the optic. The surfaces of the optics must be extremely smooth and have the appropriate shape to reflect the light to the detector or target. This type of optic is often referred to as a Wolter telescope. There are successful telescopes with this geometry made from nickel, aluminum, and glass. These telescopes use expensive substrates and are time consuming to form and assembly.

X-ray optics require precise form and finish to effectively reflect the high energy photons at grazing incidence. One embodiment of an optic produced in accordance with the present invention utilizes the spin casting of polymers at elevated temperatures which creates an extremely smooth and straight surface 12 on the optic 10 due to the decreased viscosity of the polymer at elevated temperatures and centrifugal force creating by spinning the optical substrate during forming. Once the polymer is allowed to return to room temperature, the optical substrate 11 is removed from the mold as a full cylinder of revolution. At this point the optical substrate 11 is coated. For example, optical substrate 11 can be coated with a multi-layer coating or other reflective coating to produce the desired reflectivity for a given application.

Thermally formed substrates from flat and very smooth sheets of thin glass are the current state of the art. The slumping into or over a mandrel of the correct size does not produce the required straightness of the final optic and the optic must be elastically deformed to correct this deficiency. The optic 10 produced in accordance with the present invention produces a substrate that is straight along the optical axis and has the smoothness that is required for a high energy photon reflector. One advantage of the optic 10 produced in accordance with the present invention is the ease of fabrication, extremely low cost, and very low mass compared to currently technologies that use nickel, glass, and other exotic materials.

The term optic is used in this document to describe the finished reflecting element in a high energy telescope or collimator. A high energy optic is comprised of a reflecting surface that can be gold, platinum, or a multilayer coating. A multilayer coating consists of many thin layers of two alternating metals, such as tungsten and silicon. Since the wavelength of light is extremely short and the light is presented to the optical surface at a very shallow angle, any imperfections in the surface on all lengths scales are detrimental to the performance of the optic. The requirement on roughness for the x-ray optic is typically 3.5 Å rms or less. The figure of the optic can be conic, in which the optic will have a straight profile, or have a parabolic/hyperbolic profile. In all cases, the requirement for the figure allows for only slight deviations from the intended surface profile. The tolerance is expressed in terms of angular deviation of the surface slope of the optic and can be on order of 10 arc-seconds. This tolerance depends on the intended application of the optic.

The optic 10 has numerous uses, for example the optic 10 can be used as for imaging a high energy point source. This can be accomplished by configuring the optic 10 in series through successive multiply reflections, i.e., configuring the optic 10 in series. The optic 10 can be used for astronomical telescopes for collecting collimated light from astrophysical events and focusing the light to form an image on a detector. The optic 10 can also be used for widefield imaging diagnostics for the National Ignition Facility (NIF). The optic 10 can also be used for medical imaging of tissue when injected with a radionuclide for diagnostic or treatment of particular diseases. The optic 10 can be used for any device that requires the focusing or collimation of high energy photons.

Figure 2:
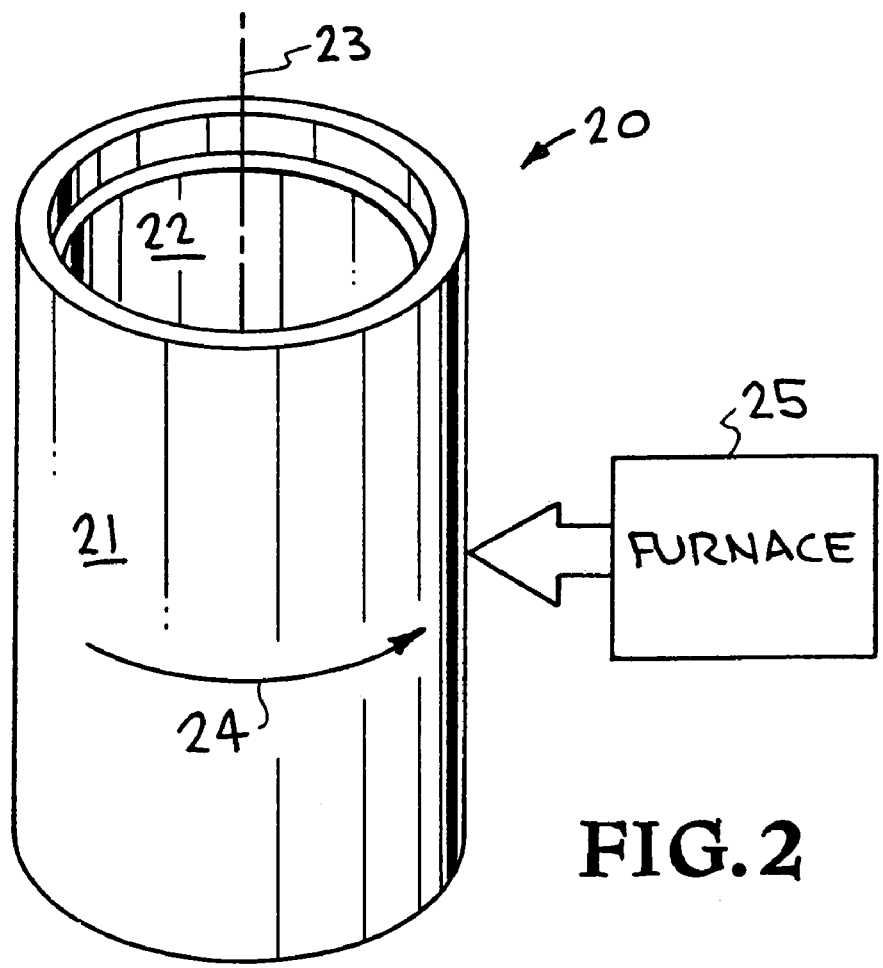
FIG. 2 illustrates one embodiment of a system for producing an optic in accordance with the present invention.

Referring now to FIG. 2, an embodiment of a system for producing an optic of the present invention is illustrated. The system is designated generally by the reference numeral 20. A polymer 22 is placed inside a cylindrical chamber 21 that rotates about the cylinder's axis 23. The optic produced in accordance with the present invention and the method of producing the optic is capable of producing a very low roughness surface, currently measured at 3.5 Å, with the capability, to produce even lower surface roughness. The method takes advantage of the low melting temperature, approximately 500° F., of polymers. The chamber 21 is rotated inside a furnace 25 at speeds that force the polymer 22 to the outside walls of the rotating cylindrical chamber 21. Centrifugally forcing the polymer against the walls of the chamber at an elevated temperature while the viscosity is low causes the internal surface of the polymer to move to a constant radius; that is, the surface flows to the same level within the chamber. After spinning at temperature for a brief period of time (about 30 minutes) the furnace 25 is turned off and the chamber is allowed to cool while still rotating.

Once cooled, the substrate is removed from the chamber 21 as a full cylindrical revolution. The substrate is sized for the particular geometry necessary for the application and coated. X-ray optics require precise form and finish to effectively reflect the high energy photons at grazing incidence. Spin casting polymers at elevated temperatures creates an extremely smooth and straight surface due the decreased viscosity of the polymer at elevated temperatures and centrifugal force creating by spinning the optical substrate during forming. Once the polymer is allowed to return to room temperature, the optical substrate is removed from the mold as a full cylinder of revolution. At this point the optical substrate is coated with a multi-layer coating or other reflective coating to produce the desired reflectivity for a given application.

The reflecting surface of the optic is deposited onto the substrate. The substrate is the structure that provides the optic the necessary stiffness to precisely mount the optic. The coating does not attenuate the inherit roughness of the substrate; therefore, the roughness of the substrate must be as good or better than the requirement for the optic. There are optics produced for x-ray applications that uses an intermediate layer between the reflecting surface and the substrate which allows substrates with high roughness to be used to produce optics. This process is referred to epoxy replication. It is an expensive and time consuming process. The optic's performance is directly related to the manufacturing flaws or limitation in the replication mandrel.

Figure 3:
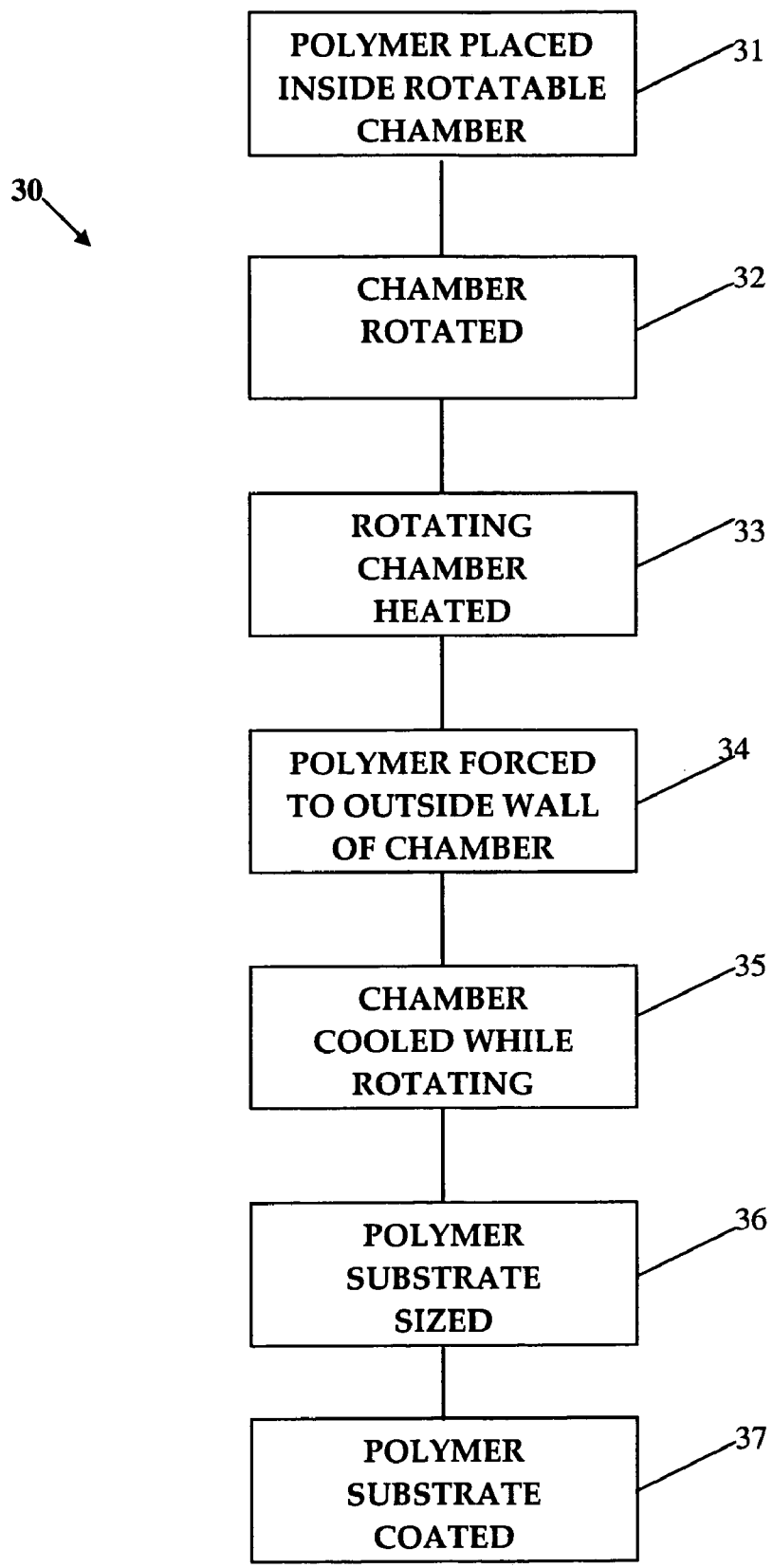
FIG. 3 illustrates one embodiment of a method for producing an optic in accordance with the present invention.

Referring to FIG. 3, one embodiment of a method for producing an optic in accordance with the present invention is illustrated. This embodiment is designated generally by the reference numeral 30. The method 30 comprises a number of steps. In step 31, a polymer is placed inside a rotateable cylindrical chamber. Step 32 comprises rotating the cylindrical chamber. Step 33 comprises heating the rotating chamber. As illustrated by step 34, this forces the polymer to the outside wall of the chamber. Step 35 comprises allowing the rotateable cylindrical chamber to cool while rotating to produce an optic substrate with a substrate surface. Step 36 comprises sizing the optic substrate and Step 37 comprises coating the substrate surface of the optic substrate.

As illustrated in FIG. 3, the polymer is placed inside the cylindrical chamber. The chamber is rotated about the cylinder's axis as illustrated by step 32. The chamber is rotated inside a furnace that heats the rotating chamber as illustrated by step 33. The chamber is rotated at speeds that force the polymer to the outside walls of the rotating cylindrical chamber as illustrated by step 34. After spinning at temperature for a brief period of time (about 30 minutes) the furnace 25 is turned off and the chamber is allowed to cool while still rotating. This is illustrated by step 35.

Steps 31 through 35 produce a substrate. The substrate is sized for the particular geometry necessary for the application and coated as illustrated by step 36. X-ray optics require precise form and finish to effectively reflect the high energy photons at grazing incidence. Spin casting polymers at elevated temperatures creates an extremely smooth and straight surface due the decreased viscosity of the polymer at elevated temperatures and centrifugal force creating by spinning the optical substrate during forming. Once the polymer is allowed to return to room temperature, the optical substrate is removed from the mold as a full cylinder of revolution. The optical substrate is coated with a multi-layer coating or other reflective coating to produce the desired reflectivity for a given application as illustrated by step 37.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of producing an optic, comprising the steps of:
placing a polymer inside a rotateable cylindrical chamber, said rotateable cylindrical chamber having an outside wall,
rotating said cylindrical chamber,
heating said rotating chamber forcing said polymer to said outside wall of said cylindrical chamber,
allowing said rotateable cylindrical chamber to cool while rotating producing an optic substrate with a substrate surface,
sizing said optic substrate, and
coating said substrate surface of said optic substrate.

2. The method of producing an optic of claim 1 wherein said step of heating said rotating chamber forcing said polymer to said outside wall of said cylindrical chamber comprises heating said rotating chamber thereby centrifugally forcing said polymer against said outside wall at an elevated temperature while the viscosity of said polymer is low.

3. The method of producing an optic of claim 1 wherein said steps of heating said rotating chamber and allowing said rotateable cylindrical chamber to cool while rotating provides said substrate surface with a roughness of substantially 3.5 angstrom rms or less.

4. The method of producing an optic of claim 1 wherein said step of sizing said optic substrate produces a curved reflecting surface.

5. The method of producing an optic of claim 1 wherein said step of sizing said optic substrate produces a conic reflecting surface.

6. The method of producing an optic of claim 1 wherein said step of sizing said optic substrate produces a curved reflecting surface that has a roughness of less than 3.5 angstrom rms.

7. The method of producing an optic of claim 1 wherein said step of sizing said optic substrate produces a conic reflecting surface that has a roughness of less than 3.5 angstrom rms.

8. The method of producing an optic of claim 1 wherein said step of coating said substrate surface produces a reflecting surface that has a roughness of less than 3.5 angstrom rms.

9. The method of producing an optic of claim 1 wherein said step of coating said substrate surface comprises coating said substrate surface with a multilayer coating.

10. The method of producing an optic of claim 1 wherein said step of coating said substrate surface comprises coating said substrate surface with thin alternating layers of metal.

11. The method of producing an optic of claim 1 wherein said step of coating said substrate surface comprises coating said substrate surface with thin alternating layers of at least two metals.

12. The method of producing an optic of claim 1 wherein said step of coating said substrate surface comprises coating said substrate surface with at least one thin layer of tungsten.

13. The method of producing an optic of claim 1 wherein said step of coating said substrate surface comprises coating said substrate surface with at least one thin layer of silicon.

14. The method of producing an optic of claim 1 wherein said step of coating said substrate surface comprises coating said substrate surface with at least one thin layer of tungsten and at least one thin layer of silicon.

15. The method of producing an optic of claim 1 wherein said step of coating said substrate surface comprises coating said substrate surface with thin layers of alternating tungsten and silicon.

* * * * *